Feb. 2, 1932.  G. H. GIBSON ET AL  1,843,552
APPARATUS FOR HANDLING MATERIAL IN MEASURED QUANTITIES
Filed Sept. 12, 1929  3 Sheets-Sheet 1
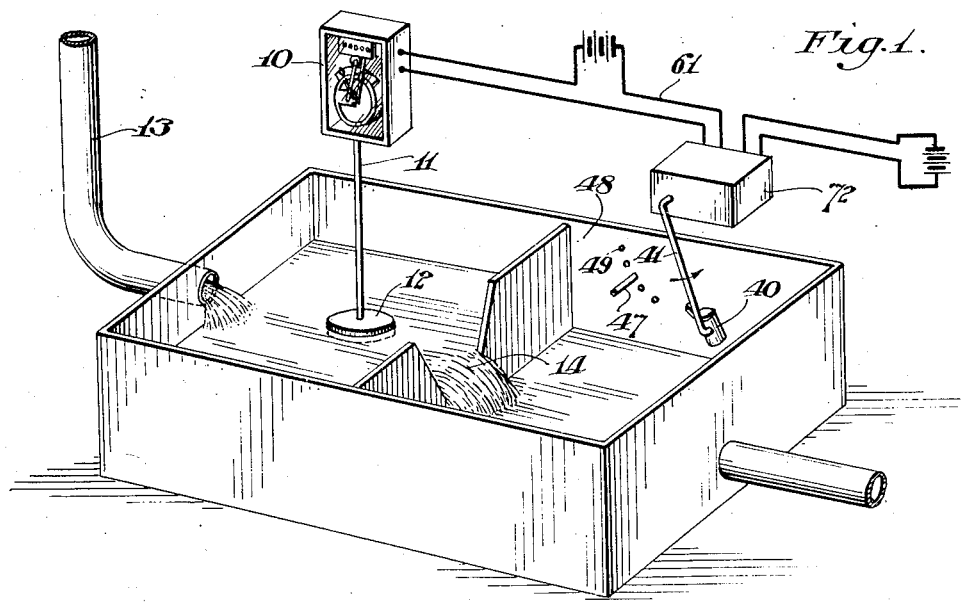
Fig.1.
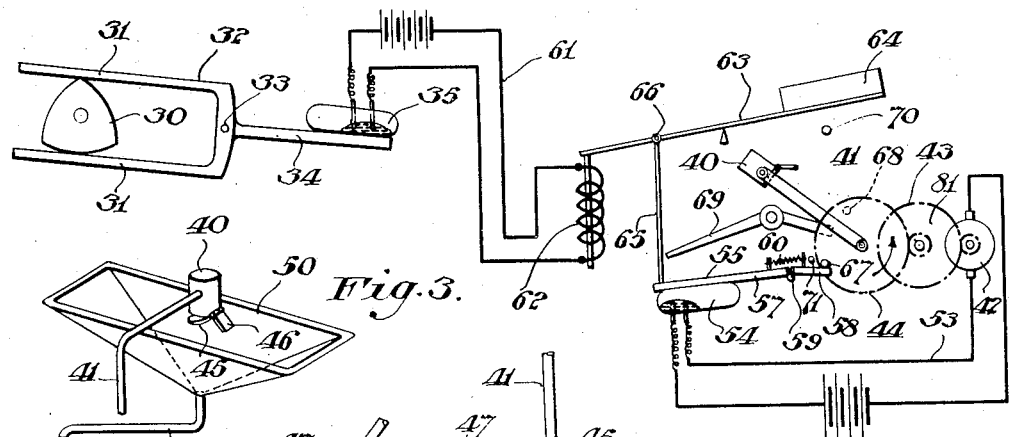
Fig.2.
Fig.3.
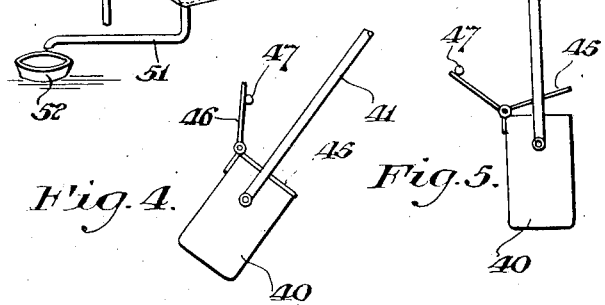
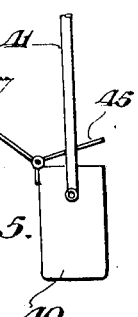
Fig.4.  Fig.5.
Inventors
George H. Gibson and
Howard C. Mitchell
By Cornelius D. Ehret
their Attorney.

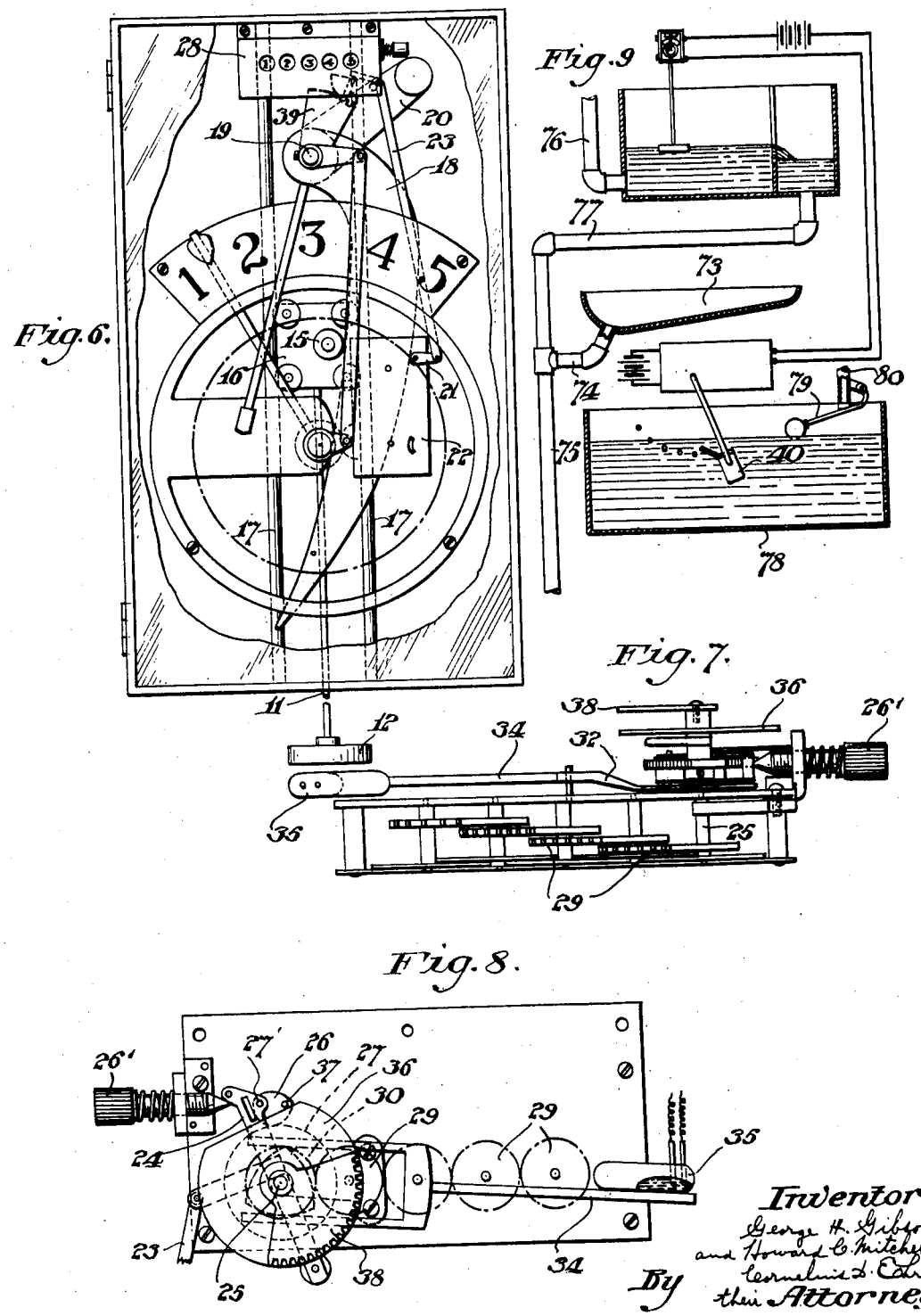

Patented Feb. 2, 1932

1,843,552

UNITED STATES PATENT OFFICE

GEORGE H. GIBSON, OF UPPER MONTCLAIR, NEW JERSEY, AND HOWARD C. MITCHELL, OF PHILADELPHIA, PENNSYLVANIA, ASSIGNORS TO COCHRANE CORPORATION, OF PHILADELPHIA, PENNSYLVANIA, A CORPORATION OF PENNSYLVANIA

APPARATUS FOR HANDLING MATERIAL IN MEASURED QUANTITIES

Application filed September 12, 1929. Serial No. 392,066.

This invention relates to improvements in apparatus for handling material in measured quantities.

The present invention contemplates the provision of apparatus such as might be used for the proportional sampling of fluid or granular material at a rate and in accordance with the flow or movement of such material, or which might be used for the addition of measured quantities of fluid or granular material to other fluid or granular material in amount dependent upon the rate of flow or movement of the latter.

One of the objects of the present invention is to provide improved apparatus of the character referred to which is simple and rugged in construction and reliable in operation.

Other objects and advantages will hereinafter appear.

For the purpose of illustrating the invention, several embodiments thereof are shown in the drawings, wherein Figure 1 is a perspective view of apparatus embodying the present improvements;

Fig. 2 is a diagrammatic view of the control arrangement for the apparatus;

Fig. 3 is a detail perspective view;

Figs. 4 and 5 are detail elevational views;

Fig. 6 is a front elevational view;

Fig. 7 is an enlarged plan view;

Fig. 8 is an enlarged elevational view, looking from the rear in Fig. 6;

Fig. 9 is a diagrammatic view, showing another system or arrangement embodying the present improvements.

Figure 10:
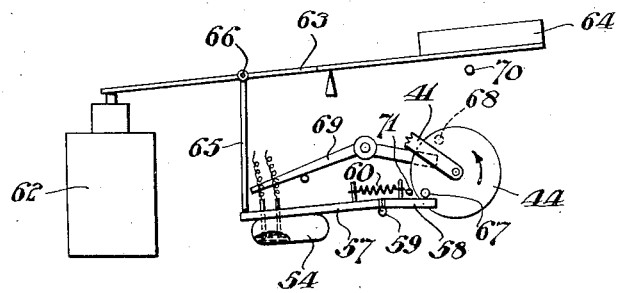
Figs. 10 to 14 are diagrammatic views illustrating respective phases of operation of the control arrangement in Fig. 2.
Figure 11:
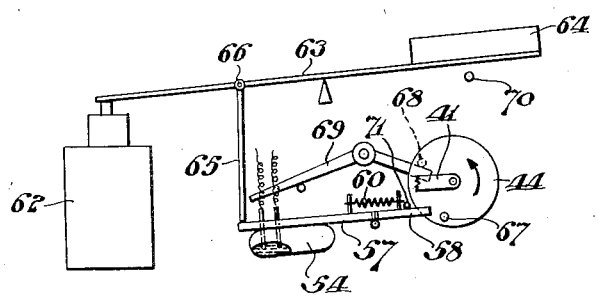
Figure 12:
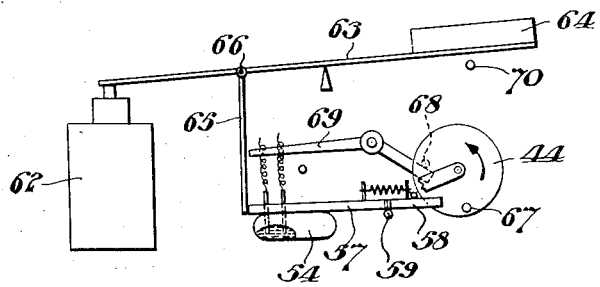

In Fig. 1, a material-measuring device, designated generally by reference numeral 10 and including the rod 11 movable vertically by the float 12, is disposed as shown to measure the fluid flowing from pipe 13 over a weir 14.

The material-measuring device 10 may be of any suitable construction, and for the purpose of illustration is shown as being of the type disclosed in detail in co-pending application Serial No. 283,243, filed June 6, 1928.

Referring more particularly to Figs. 6, 7 and 8, the construction and manner of operation of device 10, generally, is as follows.

Upon variation in the water level above the weir, float 12 provides for corresponding variation in position of element 15 carried by carriage 16 guided for vertical movement between guides 17. The cam 18 is fixed on shaft 19 and is biased in a clockwise direction by the weighted arm 20 also fixed to shaft 19, to ensure engagement of the cam with element 15.

The crank 21 is rotated at constant speed by a suitable clock mechanism 22. The link 23 provides connection between crank 21 and a frame 24 loosely mounted on shaft 25. A weighted pawl member 26 is pivotally connected to frame 24 at 27' and is provided with a serrated edge for engagement with the serrated edge of a disc 27 fixed on shaft 25 and which operates to drive the integrating meter 28 comprising the gears 29. Fixed on shaft 25 is the cam 30 disposed between arms 31 of the yoke 32 pivotally mounted at 33 and provided with the extension 34 carrying mercury switch 35.

At each upward stroke of rod 23, pawl 26 engages disc 27 to impart clockwise movement thereto, as viewed in Fig. 8, the extent of such movement being determined by the position of the cam 36 supported for rotary movement and whose high portion is disposed to engage pin 37 carried by the pawl to lift the same out of engaging or driving relation with disc 27. A gear segment 38 is fixed with respect to cam 36 and is in mesh with a complementary gear segment 39 fixed on shaft 19. The position of cam 36, accordingly, varies with cam 18, the position of the latter varying in accordance with variation of float 12 as determined by change in the liquid level above weir 14. The part of the forward stroke of pawl 26 which is effective to impart clockwise rotation to disc 27 is, therefore, dependent upon the position of cam 36 which varies in accordance with variation in the liquid flow. For the purpose of calibration, the stroke of pawl 26 may be varied by adjustment of screw 26' which can be positioned or adjusted to engage frame 24 and accordingly limit counter-clockwise movement thereof, link 23 being slightly bowed and yieldable to provide for this.

Referring to Fig. 1, a can or dipper 40 is fixed on the end of a crank or arm 41 driven by the electric motor 42 through the reduction gear train 43, the crank being fixed for rotation with gear 44 included in the gear train. The arrangement is such that upon rotation of gear 44 in a counter-clockwise direction can 40 is carried below the level of the liquid below the weir, at which time the cover 45 of the can is opened in the manner more clearly shown in Figs. 4 and 5 by engagement of the cover extension 46 with the pin 47 extending from the wall of the weir box 48. Upon opening of cover 45, the can is filled with a sample of the liquid at a certain level. Samples of the liquid at different levels may be taken by placing peg 47 in the different holes 49 to provide that the cover of the can is opened at a great or less period after the can is moved below the liquid level. A suitable trough or receiver 50 is supported as shown in Fig. 3 to receive the contents of can 40 when the same traverses the upper part of its path of travel and is therefore inverted, the trough or receiver being provided with the outlet connection 51 providing for discharge of the samples of liquid into a suitable receptacle 52.

The motor 42 is excited by the electrical circuit 53 controlled by the mercury switch 54 carried by lever 55 pivotally mounted at 59. Lever 55 is comprised of two parts 57 and 58 connected at 59 for pivotal movement with respect to each other. The spring 60, which is in tension, is connected to parts 57 and 58 and operates to hold the same yieldingly in alignment with respect to each other.

The switch 35 controls the electrical circuit providing for excitation of solenoid 62 to impart counter-clockwise movement to the lever 63 against the action of weight 64, and move member 65, pivotally connected at 66 to lever 63, downwardly into engagement with lever 55.

The operation of the apparatus is as follows.

Subsequent to flow of a predetermined amount of liquid over the weir, cam 30 will be moved to the position shown in Fig. 2, whereat switch 35 is in position to close circuit 61 and effect excitation of solenoid 62. Lever 63 is then rotated in a counter-clockwise direction to the position shown in Figs. 2 and 10 to 13, whereupon member 65 engages lever 55 to break the same against the action of spring 60, as shown in Figs. 2 and 10, and move switch 54 to its circuit-closing position.

Motor 42 then operates to rotate gear 44 in the direction shown by the arrow. Shortly after gear 44 starts to rotate, the pin 67 carried thereby is moved to the position shown in Fig. 11 to permit lever part 58 to reassume its position of alignment with lever part 57 under the action of spring 60. Upon continued rotation of gear 44, the pin 68 carried by the gear engages the pivotally mounted member 69 which is moved thereby to the position shown in Fig. 12 to effect movement of member 65 out of operative relation with respect to lever part 57. Further rotation of gear 44 to complete the revolution, will bring pin 67 back to its initial position and into engagement with lever 55 to move the same to the position shown in Fig. 13, whereas switch 54 is in position to open circuit 53. Motor 42 therefore stops.

Figure 13:
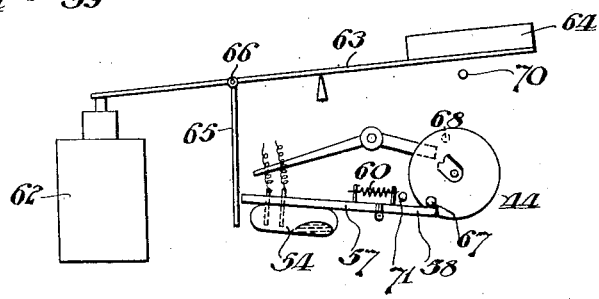
Figure 14:
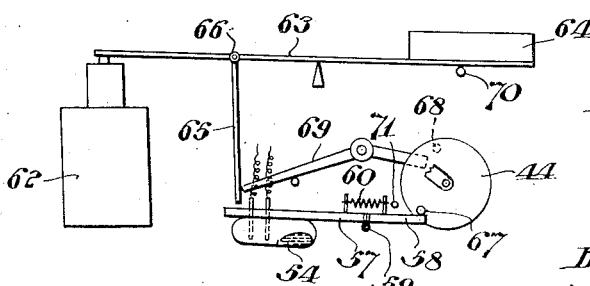

Upon continued material-measuring operation of device 10, cam 30 imparts counter-clockwise movement to yoke 32 to tilt switch 35 to a position whereat the same will open circuit 61 and permit clockwise movement of lever 63 under the action of weight 64, at which time member 65 will be raised and permitted to assume the position shown in Fig. 13 over the outer end of lever part 57. A suitable stop 70 is provided to limit clockwise movement of lever 63. Likewise, a suitable stop 71 is provided to limit counter-clockwise movement of lever 55.

Motor 42, gear train 43, solenoid 62, levers 55 and 63 and associated parts may be mounted as a unit in a suitable casing 72.

From the foregoing it will be seen that improved apparatus has been provided wherein the can or member 40 is supported for movement into and out of the container or weir box 48 and is operable upon such movement to remove a sample of the liquid and transfer the same to a receiver 50, and that the motor 42 which operates to impart operating movement to member 40 is controlled by the material-measuring device or means 10, the action being such that upon flow of a predetermined quantity of the liquid over weir 14, member 40 starts and completes its cycle of operation to remove a sample of the liquid.

In Fig. 9 is shown apparatus embodying the present improvements which is adaptable, for example, for use in steam power plants for the purpose of supplying a predetermined amount of water softener, in the form of a liquid or granular material, to feed water for a steam generator. In this system, the arrangement and manner of operation is substantially the same as that described hereinbefore, except that the trough or receiver 73, which corresponds to the receiver 50 in Fig. 3, is connected through connection 74 to the pipe 75 leading to the feed water pump (not shown). Feed water is supplied to the weir by connection 76 and is discharged into pipe 75 through connection 77. The member or can 40 operates during its cycle of operation to remove a predetermined quantity of chemical from the tank 78 with which is associated a suitable float mechanism 79 effective to control the supply of chemical to the tank from supply pipe 80 such that the level in the tank remains substantially constant.

In cases where it is desirable to remove two or more samples in Fig. 1 or to supply more water softener in Fig. 9, for each excitation of solenoid 62, the gear train may be comprised of any desired number of gears having the proper relation with respect to each other, and the crank or arm 41 fixed for rotation with the gear of the train making the desired number of revolutions for each revolution of gear 44 with which the control parts are associated. For example, if crank 41 is fixed for rotation with gear 81 of the gear train, it is obvious that for excitation of solenoid 62 and the accompanying rotation of gear 44 through one complete revolution, crank 41 will be rotated through a greater number of revolutions, depending on the ratio between gears 44 and 81. It will therefore be seen that the apparatus can be adapted upon passage or movement of a predetermined quantity of material, as determined by device 10, to remove any desired number of samples in the system shown in Fig. 1 or to supply any desired amount of chemical to the feed water in the system shown in Fig. 9.

In the system shown in Fig. 9, supply pipe 76 might be connected directly to pipe 75, in which case the weir would be replaced by a standard water meter connected directly in pipe 76 and provided with a circuit closure device of the general type disclosed in Letters Patent No. 1,617,406 of February 15, 1927 to Marden.

The various arrangements shown and described are presented as being practical embodiments of the present invention, but it will be appreciated that the invention is of much broader adaptation and that in the particular embodiments disclosed various changes might be made such as in the size, shape and arrangement of the parts without departing from the spirit of the invention or the scope of the claims.

The invention claimed is:

1. In apparatus of the character described, material-transfer means having a definite cycle of operation, material-measuring means, and means providing for control of said material-transfer means by said material-measuring means; said control means including an electrical circuit, means providing for intermittent closure of said circuit during material-measuring action of said material-measuring means, and means providing for operation of said material-transfer means upon closure of said circuit and subsequent cessation of such operation upon completion of the operating cycle of said material-transfer means and independently of occurring continued closure of said circuit.

2. In apparatus of the character described, material-transfer means, an electric motor for driving said means, a control circuit for said motor, switch means disposed in said circuit, means for effecting movement of said switch means to circuit-closing position, and means driven by said motor for effecting movement of said third-named means out of operating relation with respect to said switch means and subsequent movement of said switch means to circuit-opening position.

3. In apparatus of the character described, a container, a receiver, means supported for rotary movement into and out of said container and operable upon such movement to remove from said container some of the contents thereof and transfer the same to said receiver, an electric motor for imparting such movement to said means, a control circuit for said motor, switch means disposed in said circuit, means operable to effect closure of said switch means, material-measuring means, means providing for intermittent switch-closing action of said switch-closing means during operation of said material-measuring means, and means effective subsequent to closure of said switch means to provide for opening of said switch means subsequent to rotary movement of said first-named means through a predetermined number of complete revolutions.

4. In apparatus of the character described, an integrating flow-meter, switching mechanism operated thereby intermittently upon flow of a predetermined quantity of fluid, material-transfer apparatus whose operation is initiated by said switching mechanism, and a second switching mechanism for stopping said apparatus upon completion of an operating cycle irrespective of continued closure or opening of said first switching mechanism.

5. Sampling apparatus comprising a container, an integrating flow-meter for measuring the fluid flow through said container, mechanism for removing fluid from said container, switching means operated intermittently by said flow-meter upon flow of a predetermined quantity of said fluid for initiating operation of said mechanism, and a second switching means for stopping said mechanism upon completion of a cycle of operation to remove a definite quantity of said liquid irrespective of continued closure of said first switching means.

6. Sampling apparatus comprising a container, an integrating flow-meter for measuring the fluid flow through said container, covered bucket structure, mechanism for moving said bucket structure below the level of liquid in said container, and means for determining the depth at which said bucket structure opens, switching means operated intermittently by said flow-meter upon flow of a predetermined quantity of fluid for initiating operation of said mechanism, and a second switching means for stopping said mechanism upon removal of a definite quantity of liquid by said bucket structure irrespective of continued closure of said first switching means.

7. Proportioning apparatus comprising a container, an integrating flow-meter for measuring the flow of fluid to be treated through said container, mechanism for adding reagent to said fluid, switching means operated intermittently by said flow-meter upon flow of a predetermined quantity of fluid for initiating operation of said mechanism, and a second switching means for stopping said mechanism upon completion of a cycle of operation to add a predetermined quantity of reagent irrespective of continued closure of said first switching means.

8. In apparatus of the character described, an integrating flow-meter, structure intermittently moved to a predetermined position upon flow of a predetermined quantity of fluid, material-transfer apparatus, and switching mechanism operable by said structure when in said position for initiating a cycle of operation of said apparatus and operable by said apparatus upon completion of an operating cycle through said structure may be in said predetermined position.

GEORGE H. GIBSON.
HOWARD C. MITCHELL.

CERTIFICATE OF CORRECTION.

Patent No. 1,843,552.                                                            February 2, 1932.

GEORGE H. GIBSON ET AL.

It is hereby certified that error appears in the printed specification of the above numbered patent requiring correction as follows: Page 2, line 23, for the word "great" read greater; page 4, line 30, claim 8, for "through" read though; and that the said Letters Patent should be read with these corrections therein that the same may conform to the record of the case in the Patent Office.

Signed and sealed this 5th day of July, A. D. 1932.

M. J. Moore,
(Seal)                                                              Acting Commissioner of Patents.